July 6, 1954
C. E. DRAKE
2,682,790
SAW GRINDER
Filed Jan. 31, 1951
5 Sheets-Sheet 1
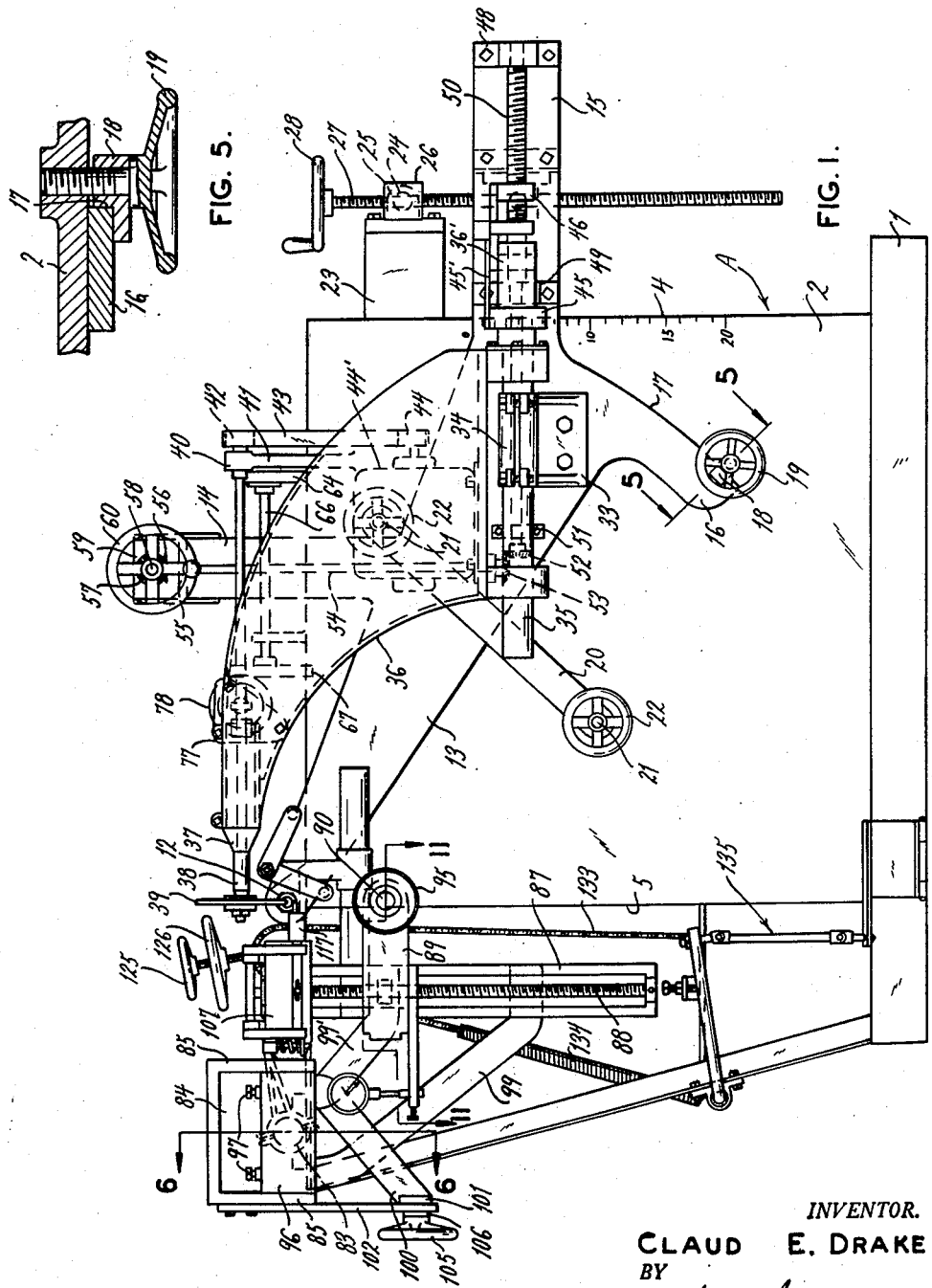
INVENTOR.
CLAUD E. DRAKE
BY
*Alfred W. Petchaft*
ATTORNEY July 6, 1954
C. E. DRAKE
2,682,790
SAW GRINDER
Filed Jan. 31, 1951
5 Sheets-Sheet 2
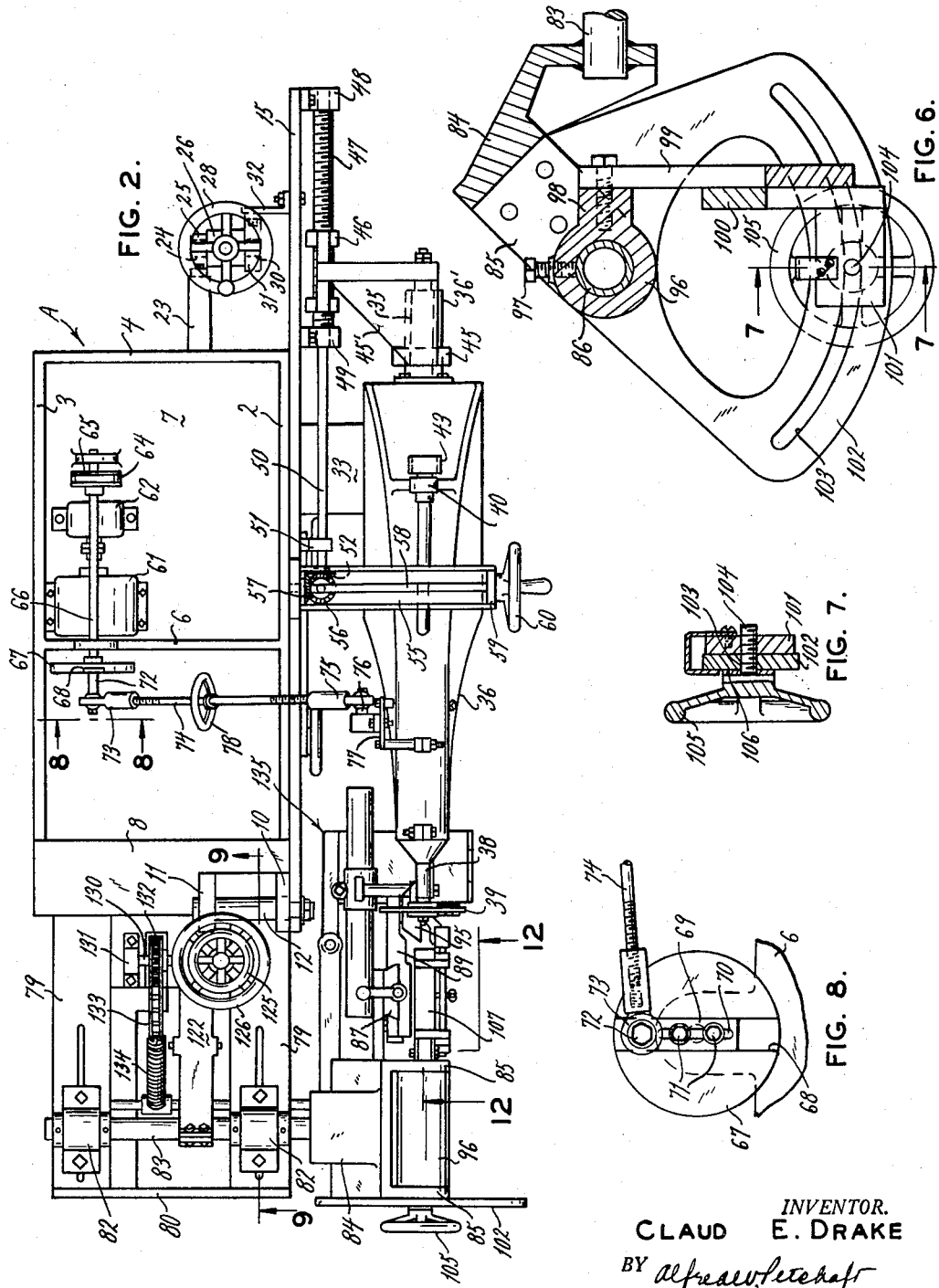
INVENTOR.
CLAUD E. DRAKE
BY Alfred W Petchaft
ATTORNEY

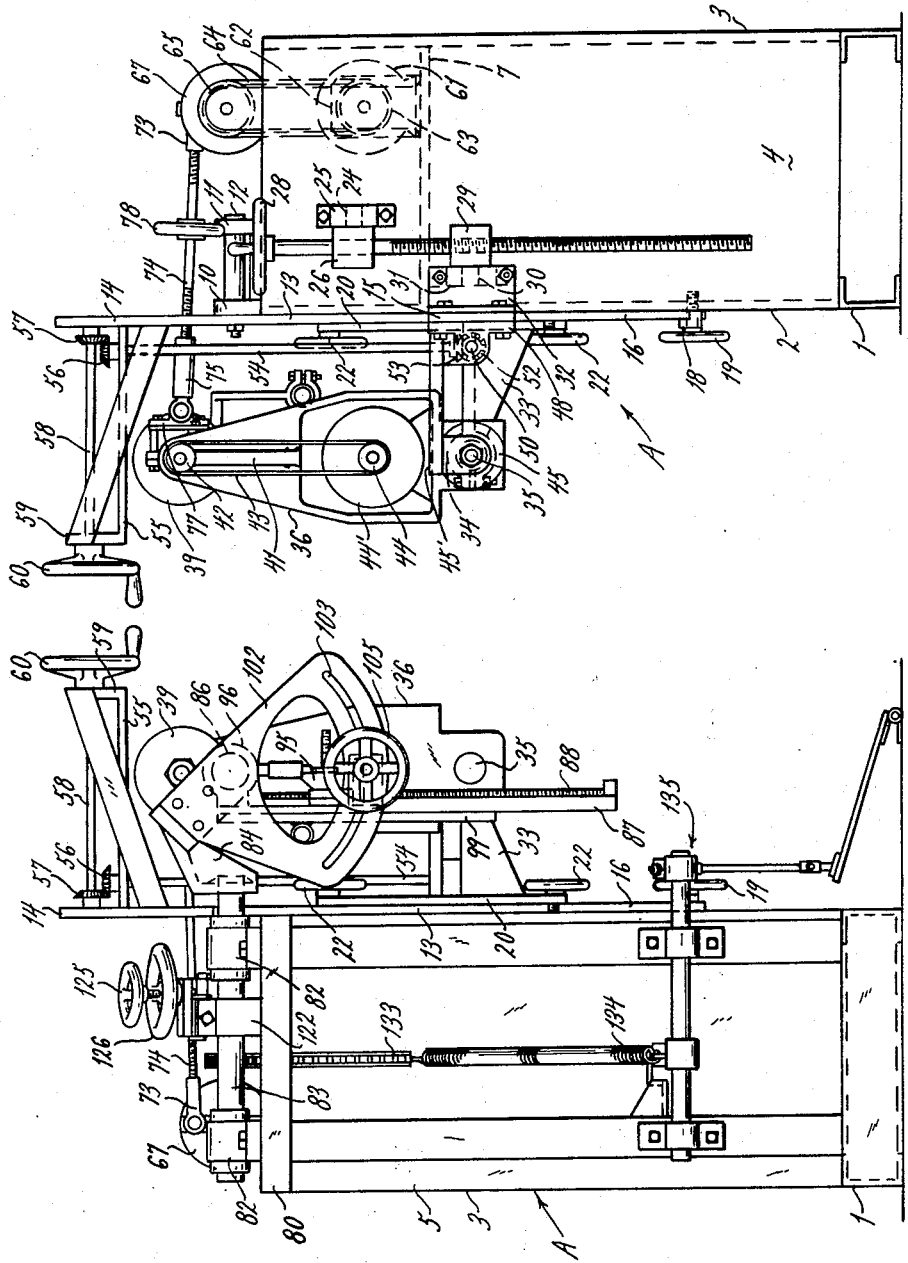

July 6, 1954     C. E. DRAKE     2,682,790
SAW GRINDER
Filed Jan. 31, 1951     5 Sheets-Sheet 4
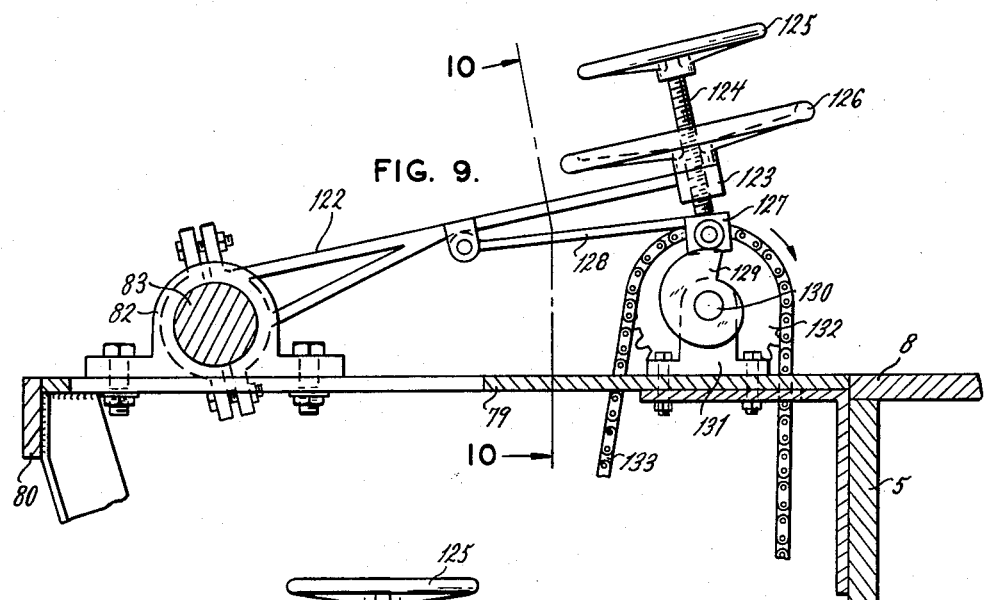
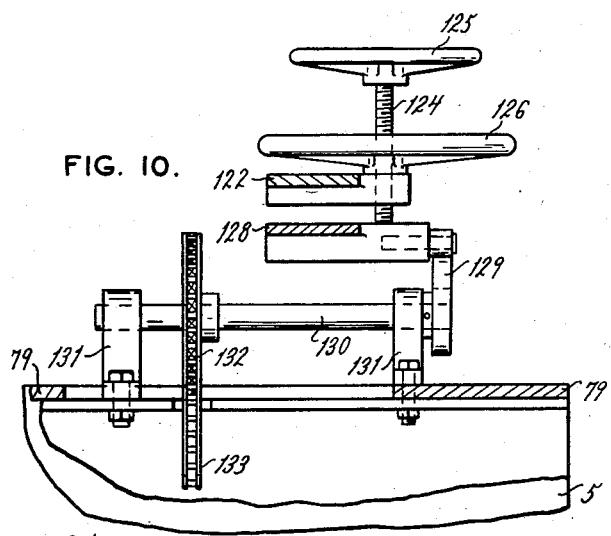
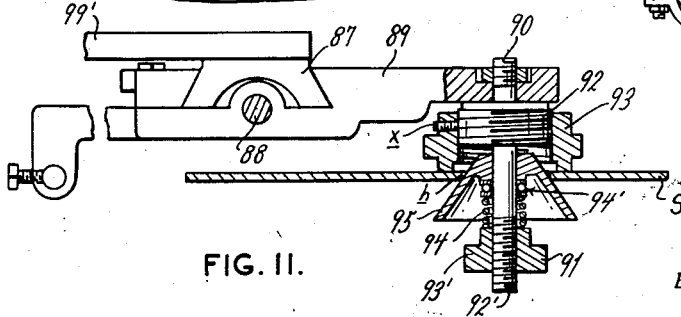
INVENTOR.
CLAUD E. DRAKE
ATTORNEY July 6, 1954    C. E. DRAKE    2,682,790
SAW GRINDER
Filed Jan. 31, 1951    5 Sheets-Sheet 5
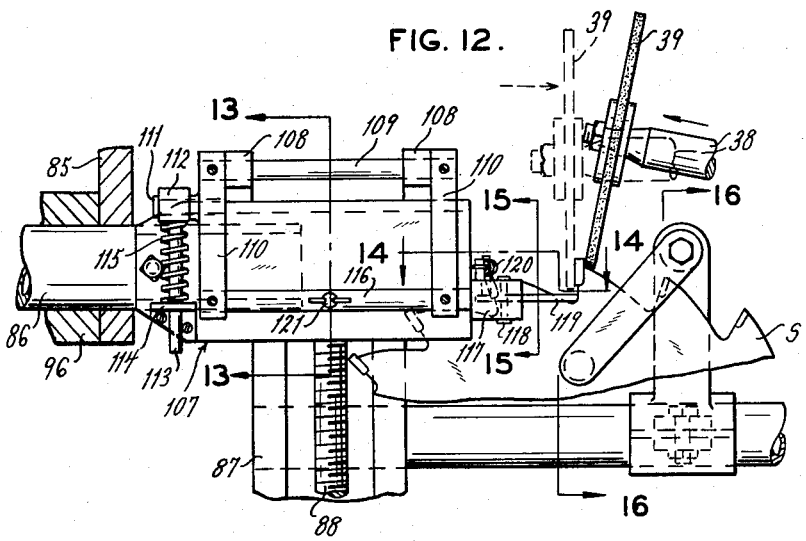
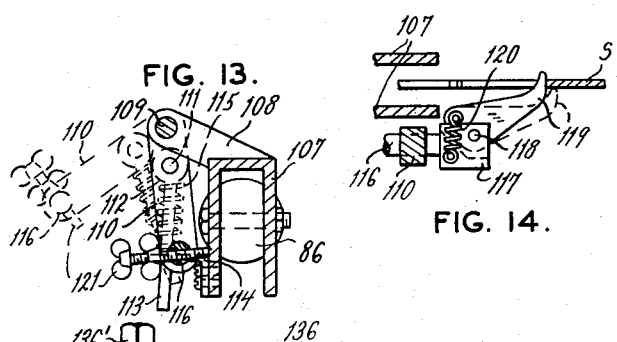
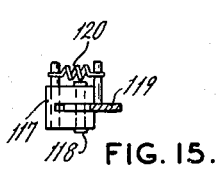
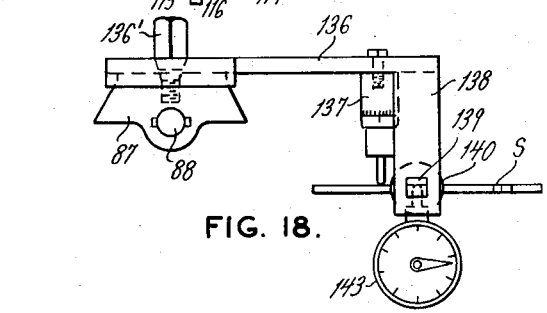
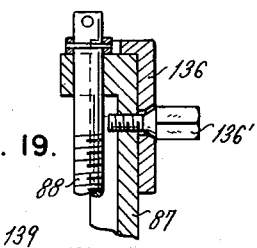
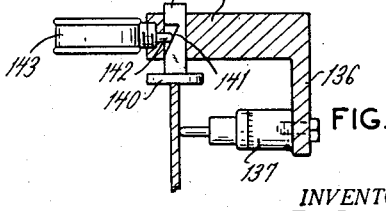
INVENTOR.
CLAUD E. DRAKE
BY Alfred W. Petchaft
ATTORNEY
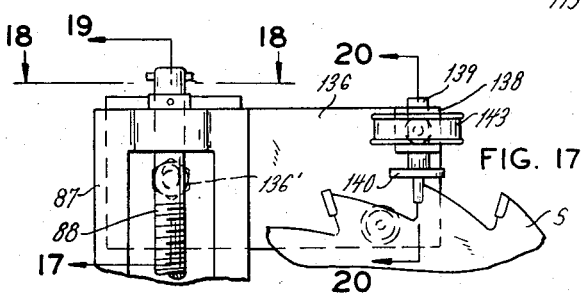

Patented July 6, 1954

2,682,790

UNITED STATES PATENT OFFICE 2,682,790

SAW GRINDER

Claud E. Drake, Brentwood, Mo.

Application January 31, 1951, Serial No. 208,814

9 Claims. (Cl. 76—40)

This invention relates in general to certain new and useful improvements in saw grinders and, more particularly, to a grinder for grinding and sharpening circular cutters for dense alloy tips.

One of the principal problems in the manufacture and sharpening of circular cutters having dense alloy tips is to grind the tips in a simple and efficient manner without generating excessive heat which will reduce the efficiency and life of the tip. Such grinding operations furthermore involve a rather large number of variables inasmuch as there are many gauges and sizes of saws with a wide variety of tooth shapes and pitches. In order to grind such saws mechanically, therefore, it is necessary to provide a grinding machine which can be quickly and conveniently set up to accommodate any of these different variables and will not require the expenditure of an unprofitably large amount of set-up time on the part of the operator.

It is, therefore, the primary object of the present invention to provide a saw grinding machine which is relatively simple and inexpensive in construction and maintenance and is capable of performing highly accurate and precise operations on the teeth of carbide tipped circular cutters.

It is another object of the present invention to provide a saw grinder of the type stated which is readily adaptable and adjustable for the accommodation of a wide range of different shapes, sizes, and configurations in the saws to be ground and can be quickly and economically set up to accommodate any particular set of dimensions or conditions.

With the above and other objects in view, my invention resides in the novel features of form, construction, arrangement, and combination of parts presently described and pointed out in the claims.

In the accompanying drawings (5 sheets)—

Figure 1 is a front elevational view of a saw grinder constructed in accordance with and embodying the present invention;

Figure 2 is a top plan view of the saw grinder;

Figures 3 and 4 are opposite end elevational views of the saw grinder taken, respectively, from the right-hand and left-hand ends thereof (reference being made to Figure 1);

Figures 5 and 6 are fragmentary sectional views taken along lines 5—5 and 6—6, respectively, of Figure 1;

Figure 7 is a fragmentary sectional view taken along line 7—7 of Figure 6;

Figures 8 and 9 are fragmentary sectional views taken along lines 8—8 and 9—9, respectively, of Figure 2;

Figure 10 is a fragmentary sectional view taken along line 10—10 of Figure 9;

Figure 11 is a fragmentary sectional view taken along line 11—11 of Figure 1;

Figure 12 is a fragmentary sectional view taken along line 12—12 of Figure 2;

Figures 13, 14, 15 and 16 are fragmentary views taken along lines 13—13, 14—14, 15—15, and 16—16, respectively, of Figure 12;

Figure 17 is a fragmentary front elevational view of the vertical adjustment slide with a setting gauge removably mounted thereon; and Figures 18, 19, and 20 are fragmentary sectional views taken along lines 18—18, 19—19, and 20—20, respectively, of Figure 17.

Referring now in more detail and by reference characters to the drawings, which illustrate a preferred embodiment of the present invention, A designates a grinder comprising a relatively heavy flat horizontal base plate 1 and four upstanding plate-like wall members welded together along their vertical margins to form an open top rectilinear machine frame including a front wall 2, a rear wall 3, and side walls 4, 5. Midway between the side walls 4, 5, and extending transversely between the front and rear walls 2, 3, is an intermediate vertical reinforcement wall 6. Similarly, welded between the reinforcement wall 6 and the side wall 4 in downwardly disposed relation to the upward margins thereof is a horizontal supporting plate 7. Also welded to the upper margins of the front wall 2, rear wall 3, and side wall 5 and extending horizontally inwardly thereacross for a short distance from the side wall 5 is a top plate 8.

Welded upon the upper face of the top plate 8 is a pair of transversely aligned upstanding ears 10, 11, and journaled horizontally therein is a short shaft 12 which projects horizontally forwardly beyond the front plate 2 for supporting engagement with the upper end of a swingable mounting element or plate 13, which, in turn, extends angularly downwardly across the front face of the front wall 2 and is integrally provided with a vertically upwardly extending arm 14, a rearwardly fitting horizontal arm 15, and a downwardly extending arcuate arm 16, the latter having its rearward margins 17 machined off to a radius or arc, the center of which is coincident with the center line of the shaft 12. The plate 13 is firmly held in any adjusted position of arcuate movement about the center line of the shaft 12, within the overall limits of its swing, by a clamp 18 mounted around and engaging its rearward portion in the area adjacent the arcuate margin 17, the clamp being arranged from a manual manipulation by the screw wheel 19. The plate 13 is further clamped into position by the long clamping bar 20, which is similarly held in place by clamping screws 21, having hand wheels 22, for facilitating the manual manipulation thereof.

Welded upon the outer face of the side wall 4 is a short bracket arm 23 which is provided with a horizontal swivel pin 24 carried in a split journal 25 and integrally joined at its forwardly presenting ends with a more or less vertically disposed rocking sleeve 26 which is internally bored for operatively receiving a shaft 27, which is rotatably but non-shiftably mounted therein. At its upward extended end the shaft 27 is provided with a hand wheel 28 and at its lower end is threaded for operative engagement within an internally threaded collar 29, which is, in turn, integrally provided with a forwardly extending swivel pin 30, rockably mounted in a split journal 31, secured upon a short bracket arm 32, rigidly mounted upon the rear face of the plate arm 15. By appropriate rotation of the hand wheel 28 the shaft 27 will be turned and the entire arm 13 swung upwardly or downwardly into any desired position of adjustment. In this connection it will be noted that the free or downwardly depending end of the shaft 27 will swing through a short arc toward and away from the side wall 4 to accommodate for the relative in-and-out movement of the bracket 32 due to the arcuate path through which it moves around the center line of the shaft 12.

Welded or otherwise rigidly secured upon the forwardly presented face of the plate 13 is an outwardly extending bracket 33 having a substantially horizontal split sleeve 34, clamped in and extending horizontally through the split sleeve 34 is a relatively large solid steel shaft 35 and slidably mounted thereon, in straddling position to the sleeve 34 is an upwardly extending rocking frame 36 which is adapted both for to-and-fro rocking movement about the longitudinal axis or center line of the shaft 35 and transversely sliding movement along the shaft 35. The rocking frame 36 projects upwardly and forwardly in an arcuate sweep and is provided at its upward end with a tubular bearing 37. Mounted in and extending through the bearing 37 is a shaft 38 removably provided at its outer end with a conventional diamond wheel 39 and at its opposite end extending rearwardly through a tail bearing 40 carried by a supporting arm 41. At such rearward end the shaft 38 is provided with a small pulley 42 which is operatively connected by a conventional driving belt 43 to a driving pulley 44 pinned upon the shaft of a driving motor 44' located upon and carried by the arm 41.

Bolted rigidly to the rearward end of the rocking frame 36 is a tubular sleeve 36' which is disposed concentrically around and slidably upon the rearwardly projecting end of the shaft 35. Rotatably but non-slidably mounted externally upon the sleeve 36' is a collar 45. Welded or otherwise rigidly connected upon the peripheral face of the collar 45 is a triangular gusset plate 45' and integrally joined to a nut-forming element 46 which is threadedly mounted on a lead screw 47 journaled non-shiftably at its opposite ends in bearings 48, 49, which are, in turn, rigidly secured on the forwardly presented face of the plate arm 15. The lead screw 47 is rigidly connected at its one end with an axially extending shaft 50 journaled in an auxiliary bearing 51 and provided at its end with a bevel gear 52 which meshes with a second bevel gear 53 pinned to the lower end of an upwardly extending intermediate shaft 54, the latter being journaled at its upward end in a forwardly extending support plate 55 and provided with a bevel gear 56, which, in turn, meshes with a bevel gear 57 pinned upon the rearward end of a shaft 58. The shaft 58 is journaled at its ends respectively in the upper end of the plate arm 14 and a short supporting plate 59 welded upon and extending upwardly from the plate 55. At its forward or projecting end the shaft 58 is provided with a hand wheel 60 to facilitate manipulation thereof. It will be seen by reference to Figures 2 and 4 that the shaft 58 may be suitably turned by manipulation of the hand wheel 60, whereupon the rotative movement thereof will be transmitted through the bevel gears 52, 53, 56, 57, to the lead screw 47. As will be seen by reference to Figures 1 and 2, rotation of the lead screw 47 will drive the nut-forming element 46 forwardly or rearwardly and this motion will be transmitted through the gusset plate 45' and collar 45 to the arm 41 so that the arm 41 and all other structure carried thereby will be bodily moved forwardly or rearwardly respectively to rotation of the hand wheel 60 and the grinding wheel 39 will thereby be fed across the work.

Bolted upon the plate 7 is a motor 61 which is connected through a conventional speed reducer 62 to a driving pulley 63 which is, in turn, connected by means of a belt 64 to a pulley 65 pinned upon a horizontally journaled shaft 66. Locked to one free end of the shaft 66 is a driving plate 67 provided with a radially extending slide-forming slot 68 for shiftably receiving a slide block 69, having an internal locking slot 70 for co-operation with locking bolts 71 by which it may be held in any position of radial adjustment across the face of the plate 67. Formed integrally with and extending laterally outwardly from the slide blocks 69 is a stud 72 provided at its outer end with the ball-and-socket fitting 73 which is internally bored and threaded for receiving one threaded end of a turn-buckle rod 74. The other threaded end of the turn-buckle rod is similarly threaded into a second ball-and-socket fitting 75 which is, in turn, swivelly mounted upon a stud 76 rigidly secured to a bracket plate 77 which is, in turn, securely bolted upon the inner face of the arm 41. When the motor 61 is energized the shaft 66 will be rotated and the stud 70 will function as an eccentric crank pin to shift the turn-buckle rod 74 forwardly and backwardly and thereby rocking the arm 41 together with the motor 44', shaft 38, and grinding wheel 39, backwardly and forwardly through a limited arc. The amount of arcuate movement thus imparted to the grinding wheel will depend upon the degree of throw of the crank pin or stud 72 and this, in turn, depends upon the relative position of radial adjustment thereof with respect to the driving plate 67. Inasmuch as the collar 45 is rotatably but non-shiftably mounted on the sleeve 36' the feeding movement of the rocking arm 41 and the grinding wheel 39, operatively supported thereby, will not interfere with the to-and-fro rocking movement imparted thereto, but the motor 61 and conversely the rocking movement which is transmitted by the motor 61 through the turn-buckle rod 74 will not impede the feeding movement just mentioned since the turn-buckle rod 74 is connected at both ends by means of the ball-and-socket joints 73, 75. It should be noted in this connection that the axis of the shaft 35 along which the feeding movement of the rocking arm 41 takes place always lies in a vertical plane which is parallel to the shaft 66, hence, the distance between the outer and inner limits of movement of the stud 76 and 72, respectively, may vary somewhat. This variation can be compensated by adjustment of the turn-buckle screw 74 which may be turned by appropriate manipulation of the hand wheel 78.

Rigidly secured to and extending outwardly from the side wall 5 adjacent the upper margin thereof is a pair of spaced horizontal bars 79, cross connected at their outer ends by an end plate 80 and rigidly supported by angularly extending beams which are, in turn, welded or otherwise secured at their lower ends to the base plate 1. Adjustably mounted upon the bars 79 is a pair of axially aligned journals 82 for rockably supporting a horizontal shaft 83 which extends therethrough and at its forward projecting end is rigidly provided with a frame-forming element 84, the latter being integrally provided with forwardly projecting face parallel ears 85 for rockably supporting a horizontally disposed tubular shaft 86 which projects rearwardly and is provided with a vertically disposed depending slide 87 carrying a conventional lead screw 88 and a slide block 89, which can be vertically adjusted by appropriate rotation of the lead screw 88. The slide block 89 projects laterally from the slide 87 and is provided with a work-supporting arbor 90 having a threaded end for receiving a mounting nut 91 by which it is rigidly secured to the slide 87. Forwardly of the slide 87, the arbor 90 is integrally provided with a diametrally enlarged hub 92 upon which is mounted a backing collar 93 which may be optionally locked in place by means of a set screw x. Outwardly of the hub 92 the arbor 90 is again diametrally reduced to provide a shaft-like portion 92' the outer end of which is threaded to receive a clamping nut 93' which impinges upon its inner face against a spring 94 disposed encirclingly about the arbor section 92' and abuts at its inner end against a conventional ball bearing thrust collar 94' which, in turn, bears against the internal face of a work centering cone 95 adapted to accommodate the various different diameters of saw holes h which are conventionally encountered in different types of circular saws S.

As will be seen by reference to Figure 11 the particularly saw S, being grounded, may be placed upon the arbor and the work clamping nut 93' primarily tightened so that the saw will be held more or less firmly between the collar 93 and the cone 95 by the tension in the spring 94. Thereupon the collar 93 may be turned inwardly or outwardly as circumstances may require so that the midpoint of the tooth tip, that is to say the point along its cutting edge midway between its lateral sides, will be positioned accurately along the horizontal projection of the center line of the tubular shaft 86. Thereupon the set screw x may be tightened and the clamping nut 93' can be turned down so as to bring additional tension of the spring 94 to bear upon the cone 95 assuring a firm and accurate engagement of the saw S. During the course of grinding operations, however, when it is necessary to rotate the saw plate about the axis of the work supporting arbor 90 in progressing successive teeth into position for grinding the cone 95 will rotate with the work due to the action of the thrust bearing 94' but the backing collar 93 will remain stationary in its adjusted position since it is locked in such position by the set screw x.

Mounted on the shaft 86 is a tubular sleeve 96 secured thereto by means of set screws 97 and integrally provided with a rearwardly extending boss 98 to which is bolted depending reinforcement bars 99, 99', cross-connected by an L-shaped bracket 100, having a lateral leg 101 which is disposed in spaced parallel relation to the lower arcuate portion of an adjustment segment 102 rigidly secured to the outer leg 85 of the frame 84. The segment 102 is provided with an arcuate slot 103, the center of which is coincident with the center line of the shaft 86 and is adapted to receive a threaded stud 104 which extends therethrough and is threadedly mounted in the leg 101. At its outer end the stud is integrally provided with a hand wheel 105 and a clamping washer 106. Thus by loosening the threaded stud 104 the entire arbor-carrying structure can be swung inwardly and outwardly about the center line of the shaft 86 so as to place the saw plate S in various angularly disposed planes with reference to the vertical face of the front wall 2 to facilitate cutting beveled faces upon the top of the saw teeth, as will presently be more fully described.

Rigidly mounted upon one end of the shaft 86 is a short transverse bracket 107 having two spaced parallel ears 108 projecting forwardly therefrom and carrying a horizontally shaft 109 upon which is rockably mounted a pair of spaced parallel depending arms 110. One of the arms 110, however, is provided with a laterally projecting stud 111, which rockably supports the upper end of a toggle link 112 having a depending rod 113 slidably disposed through a lateral ear 114 mounted rigidly upon the bracket element 107 and biased upwardly by an encircling spring 115. At their lower ends the arms 110 carry a horizontal rod 116 provided on its outer end with a finger-block 117. Rockably mounted upon a pin 118 carried by the block 117 is a tooth-positioning finger 119 biased for latch-like engagement with the gullet faces of the saw teeth by means of a spring 120. By reason of the fact that various saws have various thicknesses it is desirable to provide for an amount of inward and outward adjustment of the finger 119. Therefore, the rod 116 is provided with a threaded thumb-screw 121 which bears against the bracket 107 and serves to adjust the entire finger-supporting structure inwardly and outwardly within desired limits.

Rigidly clamped to and extending radially from the shaft 83, along that portion of its length located between the journals 82, is an arm 122 provided at its free end with a vertically threaded boss 123 for receiving an adjustment screw 124 provided at its upper end with a hand wheel 125 and intermediate at its ends with a locking hand wheel 126. At its lower end the screw 124 projects through the boss 123 and bears against the upper face of a cam block 127 which is integrally formed upon the outer end of an auxiliary arm 128 pivoted at its other end to an intermediate portion of the arm 122. On its under face the cam block 127 bears against a single cam 129 which is pinned upon the shaft 130. The shaft 130 is, in turn, journaled between bearing elements 131 bolted upon the upper face of the plate 8. Pinned to the shaft 130 intermediate the bearing elements 131 is a sprocket ear 132 for operative engagement with a sprocket chain 133, the latter being rigidly secured at one end to a tension spring 134 and at its other end to an actuating foot pedal assembly 135. By depressing the foot pedal assembly 135 the sprocket chain 133 is drawn downwardly stretching the spring 134 and rotating the cam until the cam block 127 drops down from the high lobe of the cam 129 thereby permitting the arm 122 to rock downwardly rocking the shaft 83 and carrying the entire saw arbor supporting assembly arcuately downwardly about the horizontal axis of the shaft 83. This permits the entire work to be quickly dropped away from operative engagement with the grinding wheel 39 after a single tooth grinding operation has been completed so that the next tooth can be brought up into place by manually rotating the saw S upon the work-supporting arbor 90. It should be noted in this connection that the clamping nut 91 will be tightened fairly securely in place, but there will be a sufficient amount of very limited freedom of the saw S so as to permit manual rotation from time to time to bring various teeth into grinding position. It will also be noted by reference to Figure 9 that the vertical grinding position of the tooth may be adjusted by appropriate manipulation of the screw 124 after the vertical position has been preliminarily set up through adjustment of the lead screw 88. The adjustment afforded by the screw 124 is also very convenient where a saw being ground has alternate high and low teeth. In such case, the alternate high teeth can be successively ground around the entire periphery of the saw and thereupon the intermediate low teeth can be ground by a second rotation of the entire periphery of the saw in successive steps and the difference in height of the teeth can be provided for by appropriate adjustment of the screw 88 as gauged by the dial indicator r.

As shown in Figures 18 to 20, inclusive, an auxiliary demountable bracket plate 136 may be provided and may be removably held in place by a thumb screw 136' by which it is secured to the back face of the slide 87. The plate 136 is provided with a conventional plunger-type vernier caliper 137 for use in setting up the saw plate S on the work supporting arbor with the center point of the tooth in proper grinding position. Formed integrally with the plate and extending forwardly therefrom is an auxiliary arm 138 provided at its outer end with a slidable plunger 139 having a downwardly presented work-contacting foot 140. Along the portion of its length which is disposed within the interior of the arm 138 the plunger 139 is provided with an inclined face 141 disposed preferably at an angle of 45° to its longitudinal axis for motion-transferring engagement in an end of a gauge-plunger 142 extending from a conventional dial gauge 143 threadedly mounted in and carried by the arm 138. Thus, the auxiliary plate 136 can be mounted upon the slide 87 and the saw tip brought up into engagement therewith.

In use the saw grinding machine A is set up by positioning the saw plate S which is to be ground upon the work-supporting arbor 90 as previously described. In making the various adjustments which are necessary for setting up the machine A the bracket plate 136 is installed as above described. The thickness of the saw plate S is then determined by any conventional micrometer and the thickness divided by two to arrive at the setting for the plunger-type vernier caliper 137. The vernier caliper 137 is manually set to this setting and the back face of the saw plate adjusted along the work-supporting arbor 90 until it just touches the caliper plunger in the manner shown in Figure 20. The slide 89 is then elevated until the upper face or cutting edge of the tip just grazes the under face of the work-contacting foot 140 of the dial gauge 143. This elevating action is continued until the dial gauge shows a reading equivalent to the amount of material which it is desired to grind off of the top face of the tooth. Thereupon the auxiliary bracket plate 136, with its associated gauges, is removed and the motors 44', 61, set in operation so that the grinding wheel 39 will be rapidly rotated and, at the same time, swung to-and-fro by the rocking movement imparted to the rocking frame 36. When the grinding wheel 39 is up to full speed the hand wheel 28 is turned slowly traversing the arm 41 forwardly and feeding the grinding wheel across the top of the tooth tip. The rapid reciprocation of the grinding wheel to-and-fro across the work makes it possible to grind with maximum efficiency and perfection all types of circular saws and particularly saws which are tipped with tungsten, carbide and other dense alloy tips. The amount of material removed in any single pass of the wheel is so slight that an undue amount of heating of the tip will not take place, yet by very rapid reciprocation through a large number of passes, a large amount of material can be removed in a relatively short period of time. In addition, it will be noted that the wheel, in passing under the work, describes a slight arc over a relatively long radius with the effect that the welding point of the tooth tip is imperceptibly higher than the lateral points of the tooth tip. In other words, the tooth is ground toward the center, so to speak, to an almost unmeasurable degree. This grinding, however, is sufficient to prevent feather-edged sharpness at the outer corners of the saw tip and, therefore, said tips ground on the present machine A will be longer wearing and much more durable. It will be understood in this connection that by employing such dimensions for the rocking arm 41 it is possible to accumulate the rocking effect of the tooth tip.

After the first tooth has been ground across the top the feeding movement imparted to the grinding wheel by rotation of the hand wheel 60 is stopped and the foot pedal 135 depressed lowering the saw plate S out of grinding position. The saw plate S is then manually rotated bringing the next tooth up into position for grinding. In so doing such next tooth is manually rotated at a distance past its desired position and then positioned with the indexing finger 119. It will be noted by reference to Figure 14 that the indexing finger 119 is free to swing backwardly as the tooth passes it with a sort of latch-like action as the saw plate S is manually rotated to bring the last tooth into operative position.

Thereupon the foot pedal 135 is released allowing the saw to spring back into actual position and the hand wheel 60 reversingly turned, traversing the grinding wheel backwardly across the new tooth tip to remove from it the desired amount of material. The grinding of the saw plate S is thus materially speeded up since the grinding wheel 39 may be set in either direction across the work and will grind the first tooth and every odd numbered tooth thereafter on its forward stroke and similarly will grind the second tooth and every even numbered tooth thereafter upon its return feeding movement. It will, of course, be remembered that all during each feeding stroke the grinding wheel 39 is being reciprocated or worked rapidly to-and-fro across the work by the rocking movement imparted to it by the motor 61.

Where it is desired to grind a beveled top face upon the tooth the slide 87 and all the associated supporting structure may be angularly worked forward or backward about the center line of the tubular shaft 86 as an axis of rotation and the grinding operation carried out as above described. If it is desired to grind a bevel in one direction on the first and every odd numbered tooth thereafter and similarly to grind a specifically directed bevel on the second and every even numbered tooth thereafter the saw plate will be set up to one angle of inclination and the odd numbered teeth shifted in the first grinding circuit around the saw plate S. Next the plate will be tilted so that it is set up at the appropriate angle for grinding the desired bevel on the even numbered teeth and every even numbered tooth is ground on the second grinding circuit of the saw plate S.

It should be noted in this connection that the center line of the shaft 12 and the center line of the tubular shaft 86 are arranged for precise intersection at right angles to each other at a point out in front of the machine beneath the grinding wheel and the grinding wheel should be of such diameter that its point of contact with the work will also be precisely tangent to the point of intersection between the center lines of the shaft 12 and shaft 86. This point of intersection and tangency is the precise point at which the center point along the top cutting edge of the tooth tip must be made to coincide. As a practical matter it may not be economically feasible or proper to dress the grinding wheel so accurately as to maintain the above mentioned precise degree of tangency. It, of course, will be obvious that this precision of tangency can be obtained by incorporating any conventional type of adjustment means into the shaft 12 so that the horizontal axis of the shaft 12 may be adjusted upwardly or downwardly slightly within appropriate limits to compensate for wear on the diameter of the wheel. Such adjustment can be achieved by the use of an eccentric shaft, shimmy, or any other conventional expedient.

It should also be noted in this connection that the saw tip can be ground to any desired angle of back-clearance within reasonable limits by appropriate adjustment of the shaft 27 which swings the entire plate 13 upwardly or downwardly around the center line of the shaft 12 so that the angular line along which the grinding wheel 39 is fed will not be horizontal, but will be depressed from the horizontal by some selected angle which is the equivalent of the desired angle of back-clearance. Even in this position, however, the line along which the grinding wheel is fed will intersect the above described point of intersection between the center lines of the shafts 12 and 86 so that the arc of contact between the periphery of the grinding wheel and tooth tip will be precisely tangent to the point of intersection.

It should be understood that changes and modifications in the form, construction, arrangement, and combinations of the several parts of the saw grinder may be made and substituted for those herein shown and described without departing from the nature and principle of my invention.

Having thus described my invention, what I claim and desire to secure by Letters Patent is:

1. A grinding machine for sharpening circular saws and similar toothed circular cutters, said grinding machine comprising a base, a first shaft mounted on the base, a plate rockably mounted on and extending radially outwardly from the first shaft, a second shaft mounted on the plate perpendicularly to the first shaft, a frame rockably mounted on the second shaft for swinging movement about an axis which lies in a plane disposed at 90° to the axis of the first shaft, power driven means operatively mounted on the base and operatively connected to the frame for continuously rocking the frame to-and-fro about the second shaft, grinding means carried by the frame, means for adjusting the grinding means toward and away from the first shaft along a line parallel to the second shaft, and means on the base for supporting the work to be ground, said means being located radially outwardly from the first shaft and in spaced relation to the path along which the grinding means move due to rocking movement of the frame.

2. A grinding machine for sharpening circular saws and similar toothed circular cutters, said grinding machine comprising a base, a first shaft mounted on the base, a plate swingably mounted on and extending radially outwardly from the first shaft for arcuate movement within predetermined limits with respect to the axis of the first shaft, means for adjusting the plate to any arcuate position between said predetermined limits, means for holding said plate at such position of adjustment, a frame rockably mounted on and carried by the plate, said frame being journaled on the plate for movement about an axis which is perpendicular to a plane passing through the axis of the first shaft and is spaced radially from said first shaft, grinding means mounted on the frame for adjustable movement toward and away from the first shaft, and means on the base for supporting the work to be ground, said means being located radially outwardly from the first shaft and in spaced relation to the grinding means.

3. A grinding machine for sharpening circular saws and similar toothed circular cutters, said grinding machine comprising a base, a shaft mounted on the base, a plate swingably mounted on and extending radially outwardly from the shaft for arcuate movement within predetermined limits with respect to the axis of the shaft, means for adjusting the plate to any arcuate position between said predetermined limits, means for holding said plate at such position of adjustment, a rocking frame swingably mounted on the plate for movement about an axis perpendicular to the shaft and also being shiftable toward and away from the shaft along said axis, grinding means mounted on the frame, means for feeding the plate toward and away from the shaft along said path, and an arbor on the base for supporting the work to be ground, said arbor being located in radially spaced parallel relation to the shaft and in spaced relation to the path along which the plate is fed.

4. A grinding machine for sharpening circular saws and similar toothed circular cutters, said grinding machine comprising a base, a pivot-forming element mounted on the base, a plate rockably mounted on and extending radially outwardly from the pivot-forming element, a frame rockably mounted on and carried by the plate, said frame being journaled on the plate for movement about an axis which is perpendicular to a plane passing through the axis of the first shaft and is spaced radially from said first shaft, a grinding wheel mounted on the outer end of the frame for rotation about an axis parallel to the pivot-forming element and for swinging movement around the pivot-forming element in a plane perpendicular to its axis along a radial line, an arbor on the base for supporting the work to be ground, said arbor having its longitudinal axis disposed perpendicularly to and located radially outwardly from the pivot-forming element and in the plane along which the grinding wheel swings, and means for adjusting the work supporting means toward and away from the pivot-forming element.

5. A grinding machine for sharpening circular saws and similar toothed circular cutters, said grinding machine comprising a base, a pivot-forming element mounted on the base, a plate rockably mounted on and extending radially outwardly from the pivot-forming element, a frame rockably mounted on and carried by the plate, said frame being journaled on the plate for movement about an axis which is perpendicular to a plane passing through the axis of the first shaft and is spaced radially from said first shaft, a grinding wheel mounted on the outer end of the frame for rotation about an axis parallel to the pivot-forming element and for swinging movement around the pivot-forming element in a plane perpendicular to its axis along a radial line, an arbor on the base for supporting the work to be ground, said arbor having its longitudinal axis disposed perpendicularly to and located radially outwardly from the pivot-forming element and in the plane along which the grinding wheel swings, and means for rocking the work supporting means about a pivot substantially in the same plane with and at right angles to the pivot-forming element.

6. A grinding machine for sharpening circular saws and similar toothed circular cutters, said grinding machine comprising a base having a flat face forming a plane of reference, a main pivot-forming shaft mounted in and extending outwardly from the base with its axis perpendicular to the plane of reference, an elongated plate journaled at one end upon the main pivot-forming shaft and extending radially outwardly therefrom in spaced parallel relation to the plane of reference, a slide-shaft mounted upon and carried by said plate, said slide-shaft being spaced from the main pivot-forming shaft with its longitudinal axis positioned in non-radial relation thereto and parallel to the plane of reference, a frame being rockably and slidably journaled upon said shaft and extending radially outwardly therefrom, means carried by the plate and operatively connected with the frame for adjusting said frame longitudinally to and fro along the slide-shaft, power driven means for producing oscillatory movement, adjustable length means operatively connected at its opposite ends of universal joints to the frame and to the power driven means for transmitting the oscillatory movement of the power driven means to the frame, whereby to cause said frame to swing to and fro about the axis of the slide-shaft, a grinder shaft journaled upon the frame in radially spaced parallel relation to the slide-shaft, a prime mover also carried by the frame and operatively connected to the grinder shaft, a grinding wheel mounted concentrically on the grinder shaft with its peripheral edge proximate to the longitudinal axis of the main pivot-forming element in such a manner that upon rocking movement of the frame the grinding wheel will oscillate to and fro in an area located axially outwardly from one end of the main pivot-forming shaft and by proper sliding adjustment of the frame with respect to the slide-shaft, will be tangent at one point in its arc of swing to the axis of the main pivot-forming shaft, and work holding means operatively mounted on the base for supporting circular saws and similar toothed circular cutters in such a manner that a single tooth may be presented to the grinding wheel in the region of its oscillation.

7. A grinding machine for sharpening circular saws and similar toothed circular cutters, said grinding machine comprising a base having a flat face forming a plane of reference, a main pivot-forming shaft mounted in and extending outwardly from the base with its axis perpendicular to the plane of reference, an elongated plate journaled at one end upon the main pivot-forming shaft and extending radially outwardly therefrom in spaced parallel relation to the plane of reference, a slide-shaft mounted upon and carried by said plate, said slide-shaft being spaced from the main pivot-forming shaft with its longitudinal axis positioned in nonradial relation thereto and parallel to the plane of reference, a frame being rockably and slidably journaled upon said shaft and extending radially outwardly therefrom, means carried by the plate and operatively connected with the frame for adjusting said frame longitudinally to and fro along the slide-shaft, power driven means for producing oscillatory movement, adjustable length means operatively connected at its opposite ends of universal joints to the frame and to the power driven means for transmitting the oscillatory movement of the power driven means to the frame, whereby to cause said frame to swing to and fro about the axis of the slide-shaft, a grinder shaft journaled upon the frame in radially spaced parallel relation to the slide-shaft, a prime mover also carried by the frame and operatively connected to the grinder shaft, a grinding wheel mounted concentrically on the grinder shaft with its peripheral edge proximate to the longitudinal axis of the main pivot-forming element in such a manner that upon rocking movement of the frame, the grinding wheel will oscillate to and fro in an area located axially outwardly from one end of the main pivot-forming shaft and by proper sliding adjustment of the frame with respect to the slide-shaft, will be tangent at one point in its arc of swing to the axis of the main pivot-forming shaft, and work holding means operatively mounted on the base for supporting circular saws and similar toothed circular cutters in such a manner that a single tooth may be presented to the grinding wheel in the region of its oscillation, and means operatively associated with the work holding means for feeding the work holding means toward the main pivot-forming shaft.

8. A grinding machine for sharpening circular saws and similar toothed circular cutters, said grinding machine comprising a base having a flat face forming a plane of reference, a main pivot-forming shaft mounted in and extending outwardly from the base with its axis perpendicular to the plane of reference, an elongated plate journaled at one end upon the main pivot-forming shaft and extending radially outwardly therefrom in spaced parallel relation to the plane of reference, a slide-shaft mounted upon and carried by said plate, said slide-shaft being spaced from the main pivot-forming shaft with its longitudinal axis positioned in nonradial relation thereto and parallel to the plane of reference, a frame being rockably and slidably journaled upon said shaft and extending radially outwardly therefrom, means carried by the plate and operatively connected with the frame for adjusting said frame longitudinally to and fro along the slide-shaft, power driven means for producing oscillatory movement, adjustable length means operatively connected at its opposite ends of universal joints to the frame and to the power driven means for transmitting the oscillatory movement of the power driven means to the frame whereby to cause said frame to swing to and fro about the axis of the slide-shaft, a grinder shaft journaled upon the frame in radially spaced parallel relation to the slide-shaft, a prime mover also carried by the frame and operatively connected to the grinder shaft, a grinding wheel mounted concentrically on the grinder shaft with its peripheral edge proximate to the longitudinal axis of the main pivot-forming element in such a manner that upon rocking movement of the frame, the grinding wheel will oscillate to and fro in an area located axially outwardly from one end of the main pivot-forming shaft and by proper sliding adjustment of the frame with respect to the slide-shaft, will be tangent at one point in its arc of swing to the axis of the main pivot-forming shaft, work holding means operatively mounted on the base for supporting circular saws and similar toothed circular cutters in such a manner that a single tooth may be presented to the grinding wheel in the region of its oscillation, means operatively associated with the work holding means for feeding the work holding means toward the main pivot-forming shaft, and indexing means having an abutment face adapted for engagement with each tooth of the saw or cutter being ground, said abutment face being located in a common plane with the longitudinal axis of the main pivot-forming shaft so that the cutting face of each tooth being ground will be located, during grinding operation, in a precisely predetermined relation to the axis of the main pivot-forming shaft.

9. A grinding machine for sharpening circular saws and similar toothed circular cutters, said grinding machine comprising a base having a flat face forming a plane of reference, a main pivot-forming shaft mounted in and extending outwardly from the base with its axis perpendicular to the plane of reference, an elongated plate journaled at one end upon the main pivot-forming shaft and extending radially outwardly therefrom in spaced parallel relation to the plane of reference, a slide-shaft mounted upon and carried by said plate, said slide-shaft being spaced from the main pivot-forming shaft with its longitudinal axis positioned in non-radial relation thereto and parallel to the plane of reference, a frame being rockably and slidably journaled upon said shaft and extending radially outwardly therefrom, means carried by the plate and operatively connected with the frame for adjusting said frame longitudinally to and fro along the slide-shaft, power driven means for producing oscillatory movement, adjustable length means operatively connected at its opposite ends of universal joints to the frame and to the power driven means for transmitting the oscillatory movement of the power driven means to the frame whereby to cause said frame to swing to and fro about the axis of the slide-shaft, a grinder shaft journaled upon the frame in radially spaced parallel relation to the slide-shaft, a prime mover also carried by the frame and operatively connected to the grinder shaft, a grinding wheel mounted concentrically on the grinder shaft with its peripheral edge proximate to the longitudinal axis of the main pivot-forming element in such a manner that upon rocking movement of the frame, the grinding wheel will oscillate to and fro in an area located axially outwardly from one end of the main pivot-forming shaft and by proper sliding adjustment of the frame with respect to the slide-shaft, will be tangent at one point in its arc of swing to the axis of the main pivot-forming shaft, work holding means operatively mounted on the base for supporting circular saws and similar toothed circular cutters in such a manner that a single tooth may be presented to the grinding wheel in the region of its oscillation, means operatively associated with the work holding means for feeding the work holding means toward the main pivot-forming shaft, and indexing means having an abutment face adapted for engagement with each tooth of the saw or cutter being ground, said abutment face being located in a common plane with the longitudinal axis of the main pivot-forming shaft so that the cutting face of each tooth being ground will be located, during grinding operation, in a precisely predetermined relation to the axis of the main pivot-forming shaft, said indexing means being swingable toward and away from the work so as to be disengaged from each tooth after the grinding operation on each tooth has been completed so that a successive tooth can be moved upon into grinding position.

References Cited in the file of this patent

UNITED STATES PATENTS

| Number | Name | Date |
|---|---|---|
| 580,875 | Littlejohns | Apr. 20, 1897 |
| 1,453,765 | Octave | May 1, 1923 |
| 2,202,587 | Kitchen | May 28, 1940 |
| 2,217,145 | Stihl | Oct. 8, 1940 |
| 2,278,314 | Houchin | Mar. 31, 1942 |
| 2,410,274 | Drake | Oct. 29, 1946 |
| 2,425,234 | Erwin et al. | Aug. 5, 1947 |
| 2,547,553 | Battocchi | Apr. 3, 1951 |